（12）United States Patent
Hsu

(10) Patent No.: US 9,041,711 B1
(45) Date of Patent: May 26, 2015

(54) GENERATING REDUCED RESOLUTION TEXTURED MODEL FROM HIGHER RESOLUTION MODEL

(75) Inventor: Stephen Charles Hsu, San Carlos, CA (US)

(73) Assignee: Google Inc., Mountain View, CA (US)

( * ) Notice: Subject to any disclaimer, the term of this patent is extended or adjusted under 35 U.S.C. 154(b) by 435 days.

(21) Appl. No.: 13/466,612

(22) Filed: May 8, 2012

(51) Int. Cl.
*G06T 17/00* (2006.01)
*G06T 17/20* (2006.01)

(52) U.S. Cl.
CPC ....................................... *G06T 17/20* (2013.01)

(58) Field of Classification Search
None
See application file for complete search history.

(56) References Cited

U.S. PATENT DOCUMENTS

| | | | |
|---|---|---|---|
| 6,912,293 | B1 | 6/2005 | Korobkin |
| 6,970,593 | B2 | 11/2005 | Furukawa |
| 7,193,633 | B1 | 3/2007 | Reinhardt et al. |
| 7,605,820 | B1 * | 10/2009 | Rogers et al. ................. 345/582 |
| 2003/0152288 | A1 * | 8/2003 | Balmelli et al. ............. 382/276 |
| 2005/0007385 | A1 * | 1/2005 | Aoyama ....................... 345/632 |
| 2005/0128212 | A1 | 6/2005 | Edecker et al. |
| 2005/0212794 | A1 | 9/2005 | Furukawa et al. |
| 2009/0141020 | A1 | 6/2009 | Freund et al. |
| 2009/0244062 | A1 | 10/2009 | Steedly et al. |
| 2010/0277476 | A1 * | 11/2010 | Johansson et al. ............ 345/423 |
| 2011/0096083 | A1 | 4/2011 | Schultz |
| 2011/0182520 | A1 * | 7/2011 | Free ............................. 382/195 |
| 2011/0187716 | A1 | 8/2011 | Chen et al. |

* cited by examiner

*Primary Examiner* — Mark Zimmerman
*Assistant Examiner* — Michelle Chin
(74) *Attorney, Agent, or Firm* — Dority & Manning, P.A.

(57) ABSTRACT

An exemplary method for simplifying a texture of a three-dimensional model includes simplifying a first three-dimensional model to determine a second three-dimensional model. The first three-dimensional model has a higher resolution than the second three-dimensional model. The method also includes allocating a texture atlas for the second three-dimensional model. The method further includes filling in the texture atlas for the second three-dimensional model. Filling in the texture atlas may include determining a location on the second three-dimensional model corresponding to a pixel in the texture atlas for the second three-dimensional model, determining a location on the first three-dimensional model corresponding to the determined location on the second three-dimensional model, determining a color value texture mapped to the first three-dimensional model at the determined location on the first three-dimensional model, and setting the determined color value to the pixel in the texture atlas for the second three-dimensional model.

20 Claims, 13 Drawing Sheets

GENERATING REDUCED RESOLUTION TEXTURED MODEL FROM HIGHER RESOLUTION MODEL

BACKGROUND

1. Field

This disclosure generally relates to displaying three-dimensional models.

2. Background

A geographic information system (GIS) is a system that can be used for storing, retrieving, manipulating, and displaying a three-dimensional model. The three-dimensional model may include satellite images texture mapped to terrain, such as mountains, valleys, and canyons. The GIS uses a virtual camera to navigate through a three-dimensional environment. The virtual camera defines what portion of a three-dimensional model to display to a user in a display area.

A client device may display the three-dimensional model in a geographic information environment. The three-dimensional model may have any number of level-of-detail (LOD) representations that may be displayed in the geographic information environment. Accounting for an LOD of a three-dimensional model may increase or decrease the complexity of a three-dimensional model as a virtual camera moves closer to or farther from the model.

Texture is applied to a surface of the three-dimensional model to give the three-dimensional model a more realistic appearance. When a user switches from a higher resolution model to a lower resolution model the appearance of the texture applied to the lower resolution model may vary significantly. The geometry of the lower resolution model is simplified and includes fewer vertices than the higher resolution model. Accordingly, it may be computationally inefficient to apply the texture used for the higher resolution model to the lower resolution model.

Further, texturing of coarse resolution models is inefficient in space and time because each tile in the model spans a large area and thus may require many source aerial images (e.g., 1000 images). For example, each source image may require computing and storing a corresponding depth buffer for occlusion handling.

BRIEF SUMMARY

This disclosure generally relates to simplifying a texture of a three-dimensional model and in particular to generating a lower resolution version of a given textured three-dimensional model.

An exemplary method for simplifying a texture of a three-dimensional model includes simplifying a first three-dimensional model to determine a second three-dimensional model. The first three-dimensional model has a higher resolution than the second three-dimensional model. The method also includes allocating a texture atlas for the second three-dimensional model. The method further includes filling in the texture atlas for the second three-dimensional model. Filling in the texture atlas for the second three-dimensional model may include: determining a location on the second three-dimensional model corresponding to a pixel in the texture atlas for the second three-dimensional model, determining a location on the first three-dimensional model corresponding to the determined location on the second three-dimensional model, determining a color value texture mapped to the first three-dimensional model at the determined location on the first three-dimensional model, and setting the determined color value to the pixel in the texture atlas for the second three-dimensional model.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Figure 1:
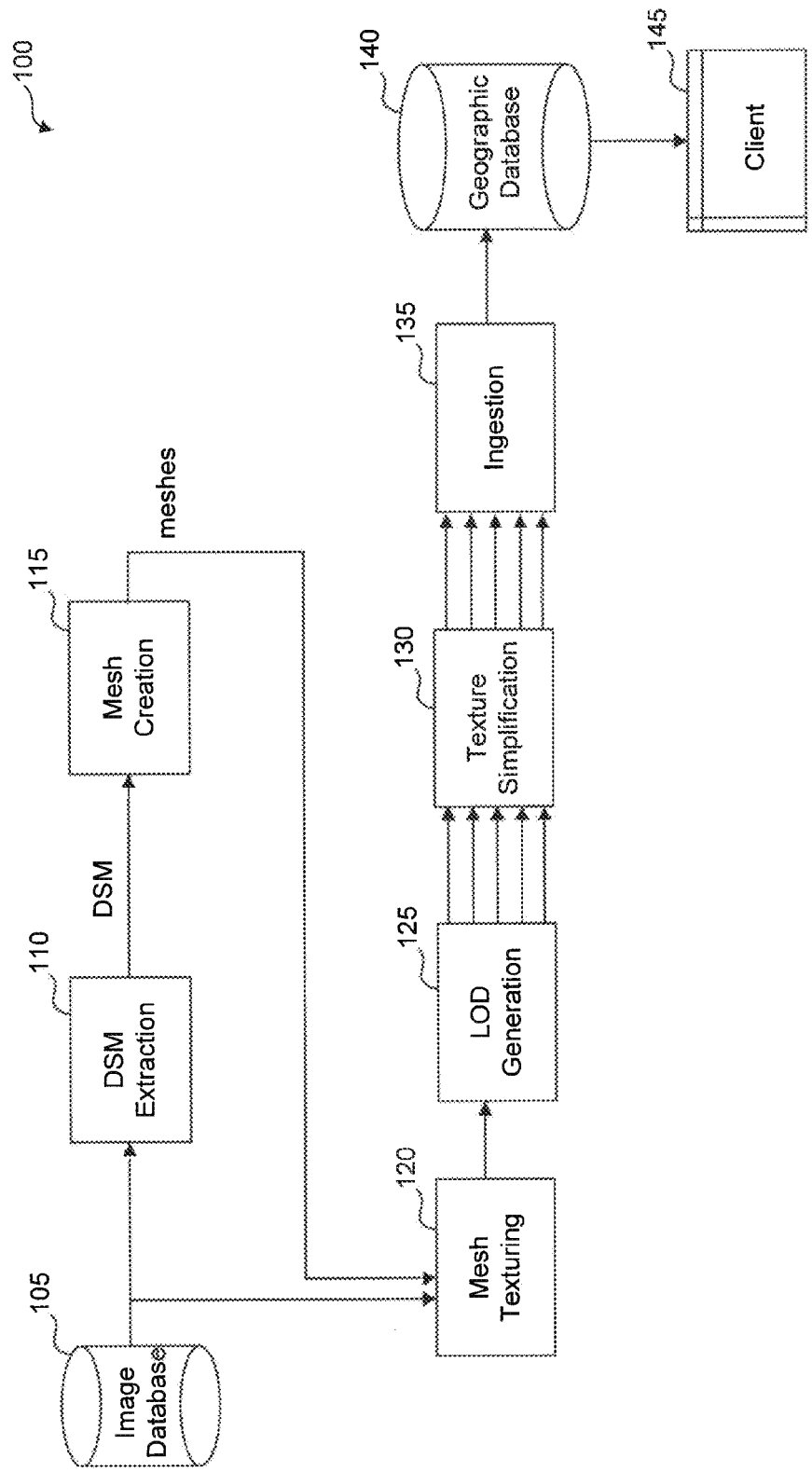
FIG. 1 is a diagram illustrating a process flow diagram for generating a textured three-dimensional model at different LODs, according to an embodiment.

I. Overview
II. Generating a Textured Three-Dimensional Model
   A. Data Extraction
   B. Mesh Creation
   C. Texture and Simplified Models
   D. Texture Simplification
   E. Render Appropriate Version of the Three-Dimensional Model III. Example Texture Simplifying System
A. Model Simplification
B. Texture Simplification
VI. Example Method
V. Example Computer Embodiment

I. Overview

This description generally relates to generating textured meshes at multiple levels of geometry and texture resolution.

Generating a lower resolution version of a given textured three-dimensional model may be useful. For example, a series of different resolution models may be generated from one source model so that the resolution appropriate for the current viewpoint is rendered on the screen. Displaying the lower resolution model is less computationally expensive than displaying the higher resolution model. Further, it is useful to reduce not only the complexity of the three-dimensional geometry of the model but also the resolution of the image textures. A lower resolution version of the textured three-dimensional geometry of the model may be more efficient to render.

This disclosure describes methods and techniques to generate the reduced resolution textures. In an embodiment, a first three-dimensional model is simplified to determine a second three-dimensional model. The first three-dimensional model has a higher resolution than the second three-dimensional model.

A texture atlas is allocated for the second three-dimensional model. A texture atlas may refer to a mapping of a color onto a portion of a three-dimensional surface.

After the texture atlas is allocated for the second three-dimensional model, the texture atlas for the second three-dimensional model is filled in. To fill in the texture atlas for the second three-dimensional model, a location on the second three-dimensional model corresponding to a pixel in the texture atlas for the second three-dimensional model may be determined. After determining the location on the second three-dimensional model, a location on the first three-dimensional model corresponding to the determined location on the second three-dimensional model may be determined, and a color value texture mapped to the first three-dimensional model at the determined location on the first three-dimensional model may be determined. The determined color value may then be set to the pixel in the texture atlas for the second three-dimensional model. Respective pixels in the texture atlas for the second three-dimensional model may be set to a color value texture mapped to a corresponding location on the first three-dimensional model.

In an embodiment, the location on the first three-dimensional model corresponding to the location on the second three-dimensional model is determined by extending a ray from the location on the second three-dimensional model to a corresponding location on the first three-dimensional model and determining an intersection of the ray and the first three-dimensional model. In an embodiment, determining a color value texture mapped to the first three-dimensional model at the determined location on the first three-dimensional model includes determining a color value texture mapped to the first three-dimensional model at the determined intersection.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Generating a Textured Three-Dimensional Model

FIG. 1 is a diagram illustrating a process flow diagram 100 for generating a textured three-dimensional model at different LODs, according to an embodiment.

A. Data Extraction

Diagram 100 includes a digital surface model (DSM) extraction stage 110 that extracts data from images in image database 105. The images may be taken of a geographic area and may be taken from multiple positions and angles from a camera source located, for example, in an aircraft. As the aircraft flies over the geographic area, the camera source may take multiple images of a particular point. Two or more images may overlap and the depths between the images may be reconstructed.

DSM extraction stage 110 defines a set of three-dimensional points. In an example, a three-dimensional geometry is a three-dimensional model of the Earth. A grid covers an area of space of the Earth, and for every location (x, y) of the grid a height is determined. An output from DSM extraction 110 may be a height field for each location of the grid.

In an example, a bundle adjustment is performed based on extracting data from the images in image database 105. The bundle adjustment calibrates cameras and aligns poses. Cameras may capture a scene at different angles and each angle may capture specific objects. A surface of a three-dimensional model may be reconstructed from the direction that the cameras were looking at a scene. For example, a camera at a 45-degree angle may capture objects beneath a bridge, and hollow spaces may be reconstructed separately for each camera. These reconstructed pieces may be referred to as patches or mesh sections.

B. Mesh Creation

A mesh creation stage 115 combines the mesh sections into a single three-dimensional mesh. In an example, an output of mesh creation stage 115 is a polygonal mesh. A polygonal mesh represents the geometry of a three-dimensional model and is a three-dimensional graphics representation for a surface that has no texture on it. The polygonal mesh may be a consistent untextured mesh that is purely three-dimensional geometry information (e.g., the mesh has no color information).

C. Texture and Simplified Models

A texture is applied to a surface of the three-dimensional model to enhance the appearance of the three-dimensional model. A mesh texturing stage 120 may determine texture pixels for a surface of a three-dimensional mesh. Mesh texturing stage 120 draws from images in image database 105. Based on the three-dimensional mesh and the images, mesh texturing stage 120 determines what each location on the surface should look like (e.g., the color of that location).

The three-dimensional model may be associated with a texture atlas. A texture atlas may refer to a two-dimensional representation of a three-dimensional model in which color values are stored and mapped to a surface of the three-dimensional model. In an embodiment, the texture atlas refers to space in an image in which color values are stored and mapped to a surface of the three-dimensional model. The texture may be defined on a surface of a manifold. An output of mesh texturing stage 120 may be a mesh having a texture map that is mapped to a surface of the three-dimensional model.

An LOD generation stage 125 generates one or more versions of a source mesh at different resolutions. A source mesh may refer to the mesh that is used to generate one or more meshes at different resolutions. Different LODs may correspond to different resolutions. For example, one or more LOD simplified versions of the source mesh may be generated. In this example, each of the first and second LOD versions has a lower resolution than the source mesh. Further, the first LOD version of the source mesh may have a higher resolution than the second LOD version of the source mesh.

It may be advantageous to display the coarser version of the model when the final set of data to be rendered to a screen is dense and the current viewpoint of the virtual camera is such that it is appropriate to render the coarser version of the model. Accordingly, the appropriate version of the model may be rendered to a screen without unnecessary processing.

D. Texture Simplification

A series of different resolution models may be generated from one source model, so that the resolution appropriate for the current viewpoint may be rendered on the screen. Further, it may be useful to reduce not only the complexity of the three-dimensional geometry of the model but also the resolution of the image textures. When the user zooms out, it is desirable to render a coarser version of the geometry and the texture information. Similarly, when the user zooms in, it is desirable to render a finer version of the geometry and the texture information.

It may be undesirable to apply the source texture atlas of the source mesh to a simplified LOD version of the source mesh because the simplified LOD version may include merged triangles that map to disjoint regions of the source texture atlas. Accordingly, it may be undesirable to use the source texture atlas and reassign texture coordinates of the vertices for the simplified model.

This disclosure describes methods and techniques to generate a reduced resolution texture for a simplified LOD version of the source mesh. For example, in an embodiment, a lower resolution version of a given textured three-dimensional model is generated. In particular, the texture atlas and texture coordinate assignments for the lower resolution version may be generated, resulting in an enhanced user experience.

A texture simplification stage 130 determines a texture atlas for simplified LOD versions of the source mesh at different resolutions. In an example, a texture atlas is allocated for each simplified LOD version of the source mesh. In an embodiment, texture simplification stage 130 generates a new texture atlas and texture coordinate assignments for one or more of the simplified LOD versions of the source mesh. The texture atlas includes pixels, and each pixel in the texture atlas is set to a color value that is associated with both the source and simplified meshes (more details are below). In this way, a consistent texture may be applied to the simplified LOD version of the source mesh.

E. Render Appropriate Version of the Three-Dimensional Model

An ingestion stage 135 ingests one or more generated versions of the source mesh at different resolutions along with the texture information, and stores this data in a geographic database 140. After the appropriate version of the source mesh is generated, the version is put into a data structure that is servable to a client 145. For example, the data may be streamed to client 145 for display in a geographic information environment. A user may manipulate the three-dimensional model and the appropriate resolution of the textured three-dimensional model may be displayed.

III. Example Texture Simplifying System

Figure 2:
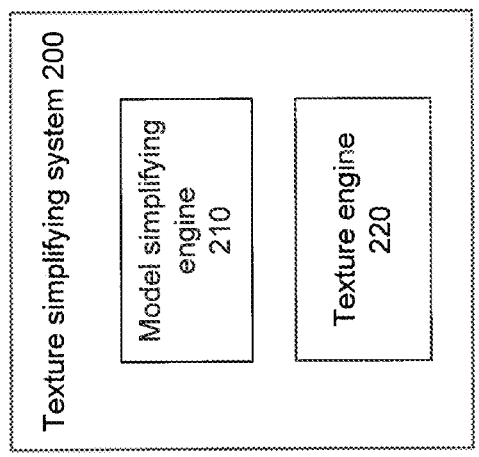
FIG. 2 is a diagram illustrating a texture simplifying system for simplifying a texture of a three-dimensional model, according to an embodiment.

FIG. 2 is a diagram illustrating a texture simplifying system 200 for simplifying a texture of a three-dimensional model, according to an embodiment.

A. Model Simplification

System 200 includes a model simplifying engine 210. Model simplifying engine 210 simplifies a first three-dimensional model to determine a second three-dimensional model. The first three-dimensional model has a higher resolution than the second three-dimensional model. Similarly, the second three-dimensional model has a lower resolution than the first three-dimensional model.

In an embodiment, a three-dimensional model is simplified by removing vertices in the three-dimensional model and joining the edges connected to the removed vertices to other vertices in the three-dimensional model. Accordingly, the simplified three-dimensional model may include fewer vertices compared to the original three-dimensional model.

Figure 3:
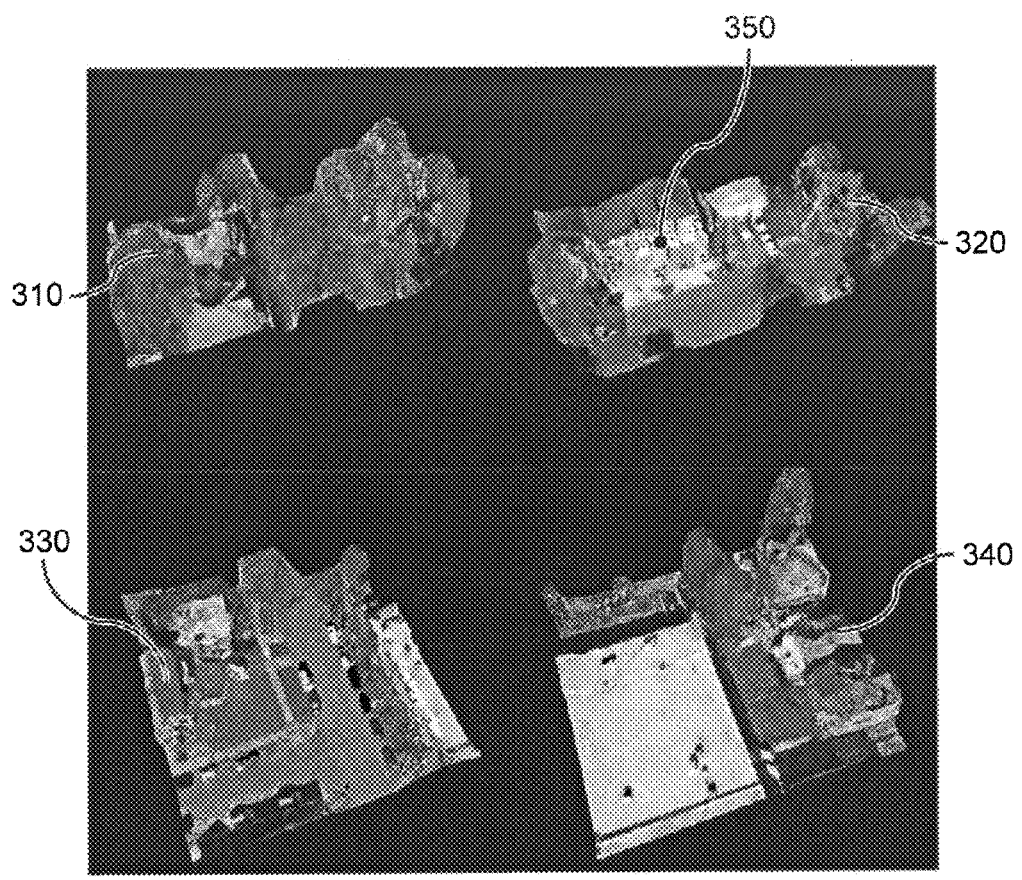
FIG. 3 is an illustration of four example textured meshes, according to an embodiment.

FIG. 3 is an illustration of four example textured meshes 310, 320, 330, and 340, according to an embodiment.

In an example, textured meshes 310, 320, 330, and 340 are adjacent meshes that may be joined together into one simplified output mesh and included in a rendering of a three-dimensional model. In particular, each of the textured meshes 310, 320, 330, and 340 may be simplified and merged together to generate a lower resolution version of the original meshes. Mesh 320 includes a three-dimensional point 350 (more details below).

FIGS. 4A-4D are diagrams illustrating four texture atlases for each of the four meshes illustrated in FIG. 3, according to an embodiment. The texture atlases include smaller sub-images that are each a texture of a part of the source three-dimensional model.

Figure 4A:
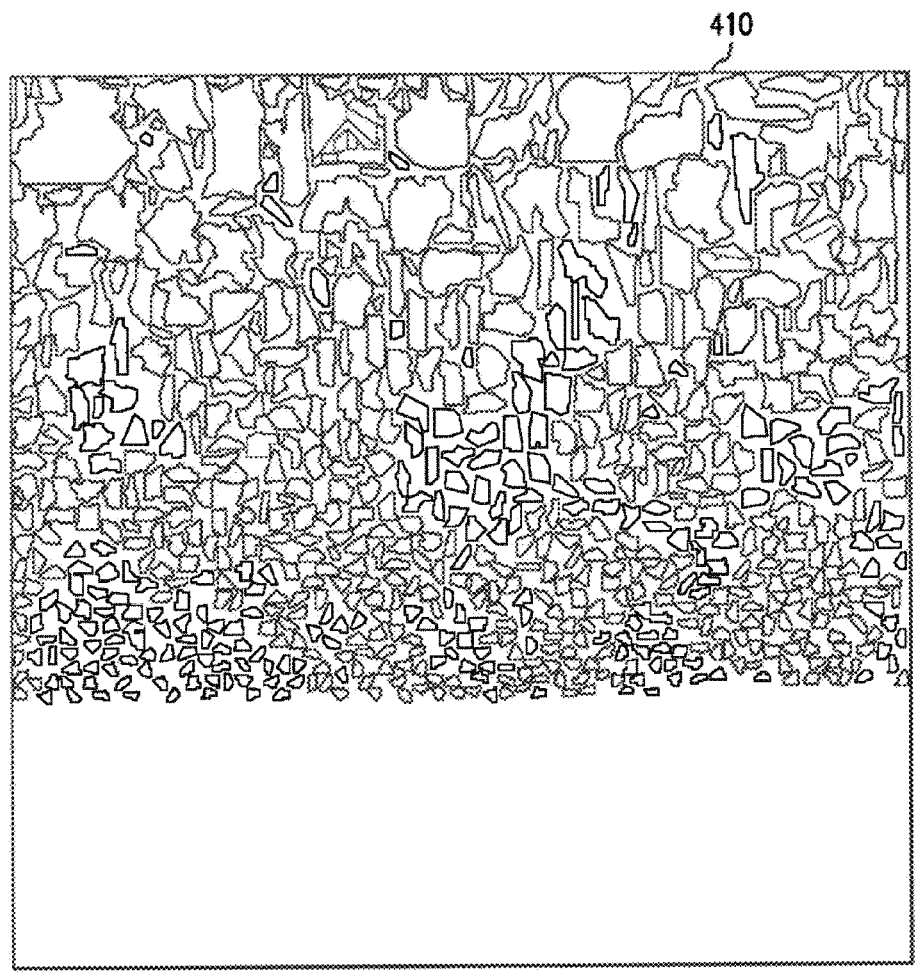
FIGS. 4A-4D are diagrams illustrating four texture atlases, according to an embodiment.
Figure 4B:
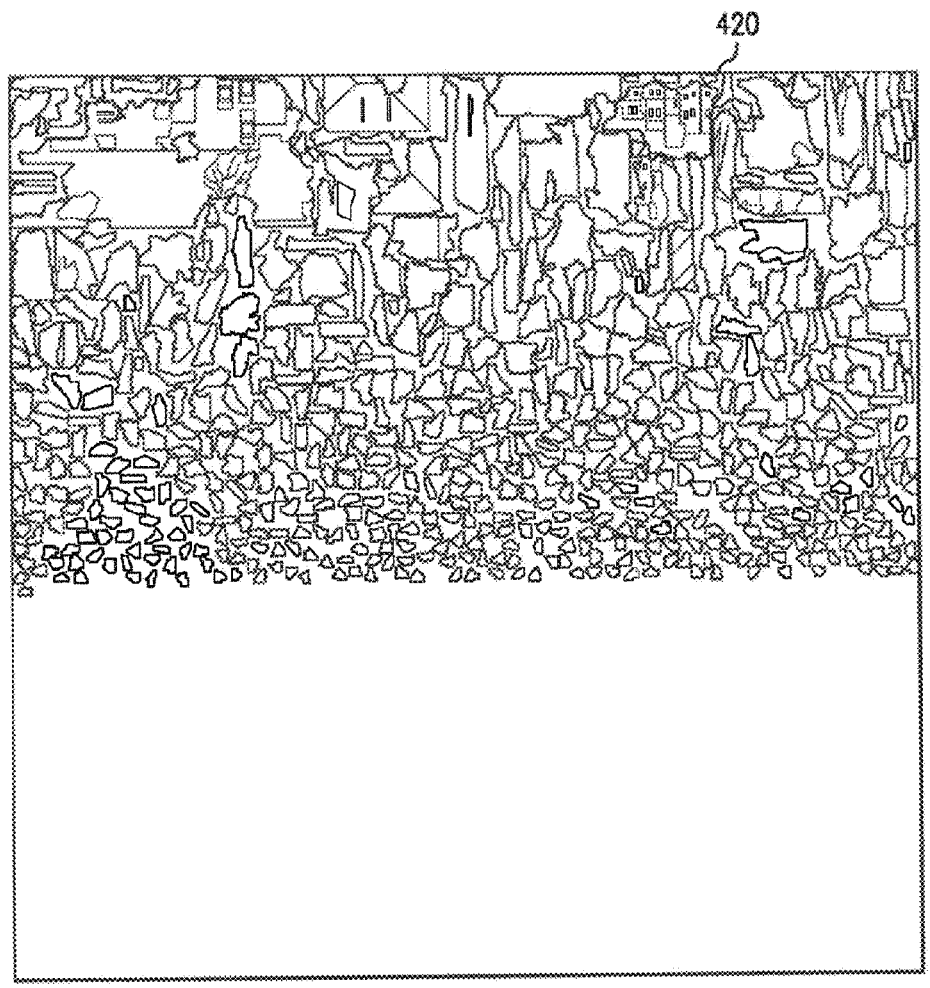
Figure 4C:
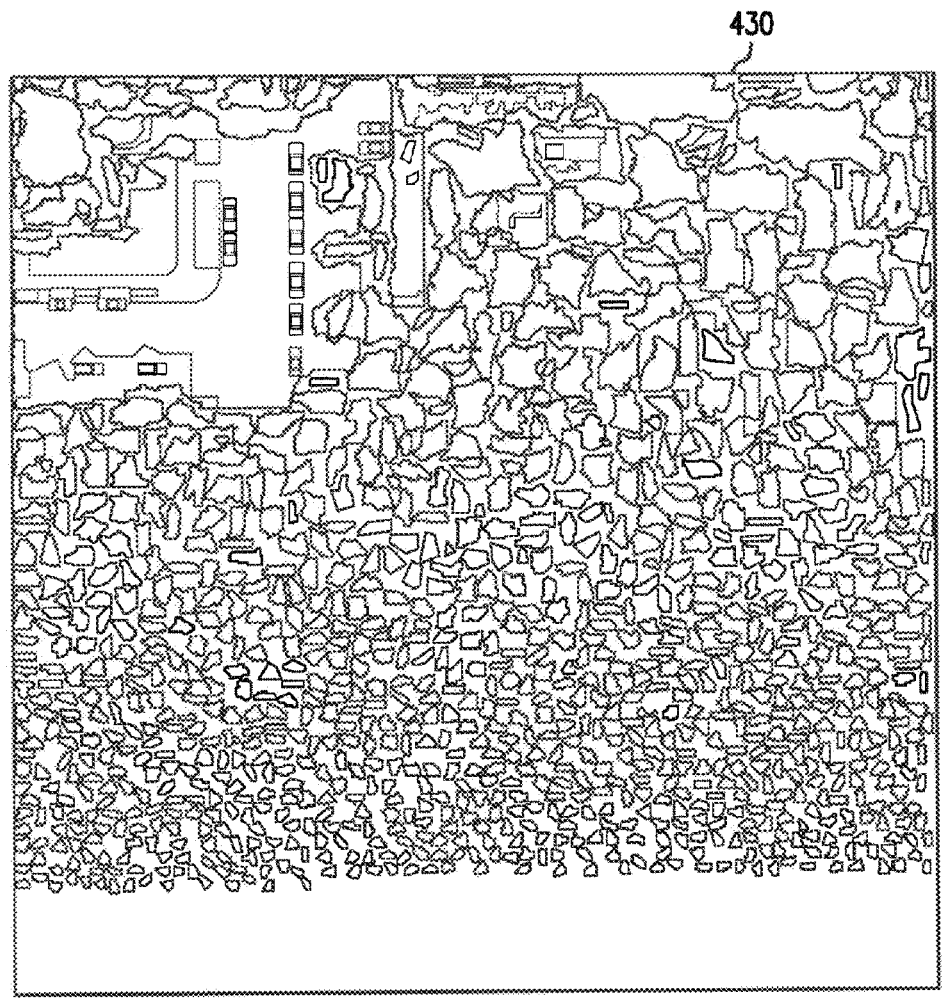
Figure 4D:
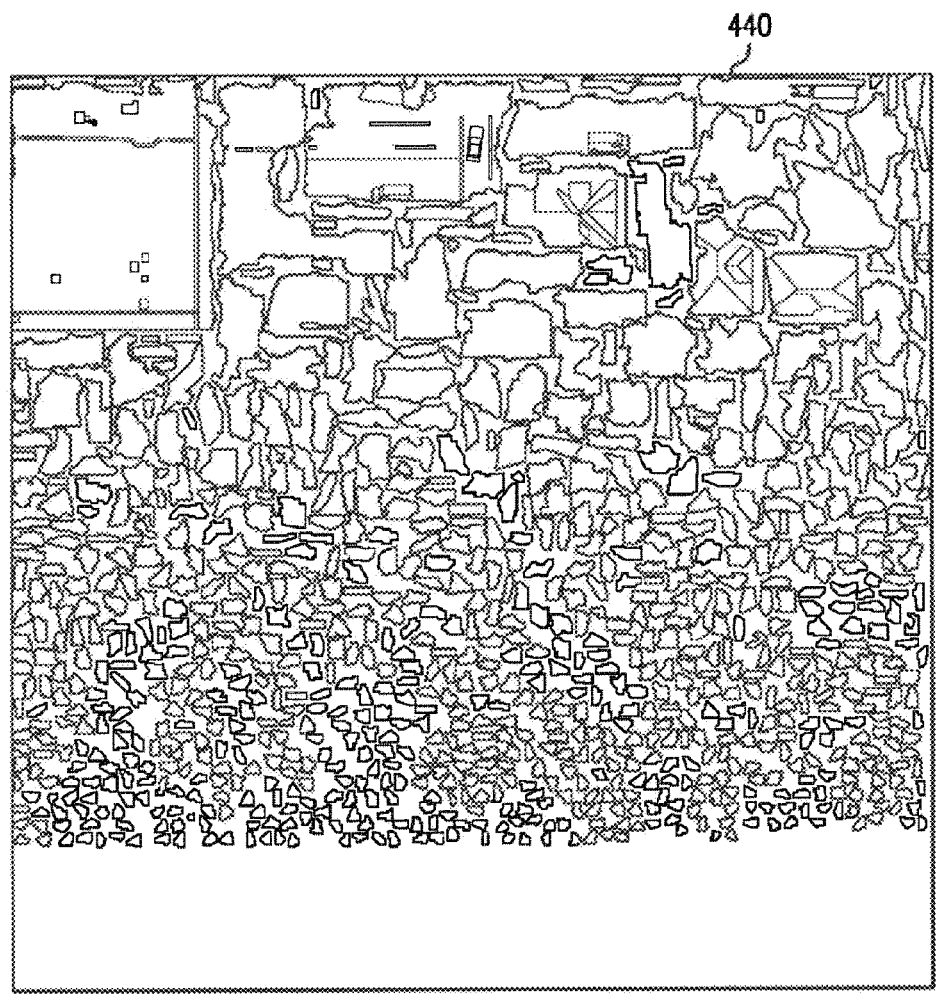

FIG. 4A illustrates a texture atlas 410 for mesh 310, FIG. 4B illustrates a texture atlas 420 for mesh 320, FIG. 4C illustrates a texture atlas 430 for mesh 330, and FIG. 4D illustrates a texture atlas 440 for mesh 340. Each triangle in a three-dimensional model is mapped to a particular color in the texture atlas.

Figure 5:
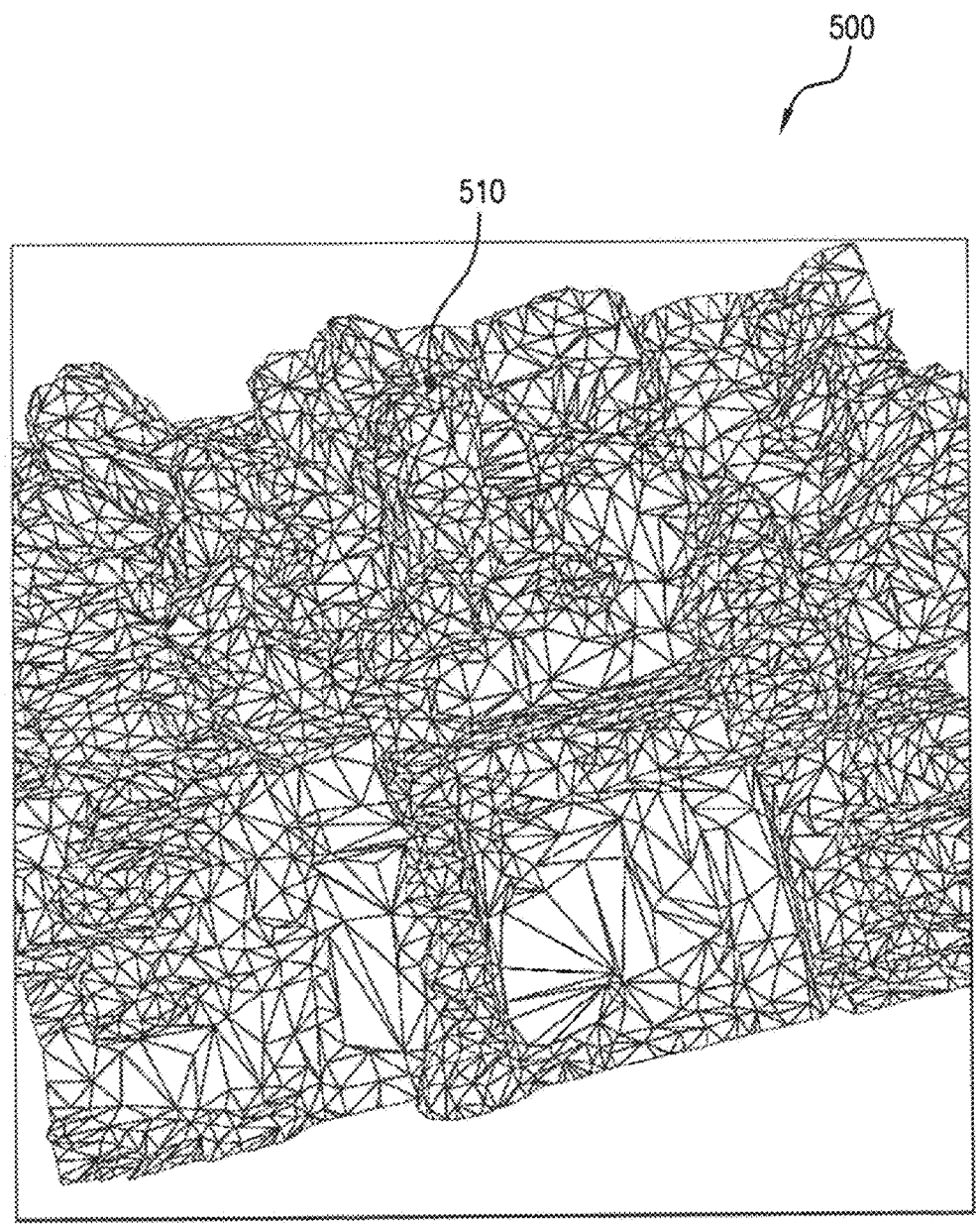
FIG. 5 is a diagram illustrating a simplified output mesh, according to an embodiment.

FIG. 5 is a diagram 500 illustrating a simplified output mesh 500, according to an embodiment. In an example, model simplifying engine 210 simplifies a three-dimensional model including texture meshes 310, 320, 330, and 340 to determine simplified output mesh 500. Photorealistic colors may be added to a surface of the simplified three-dimensional mesh to enhance the realism of the three-dimensional model. More details regarding FIG. 5 are below.

B. Texture Simplification

Referring back to FIG. 2, texture simplifying system 200 also includes a texture engine 220. Texture engine 220 allocates a texture atlas for the simplified three-dimensional model.

Figure 6:
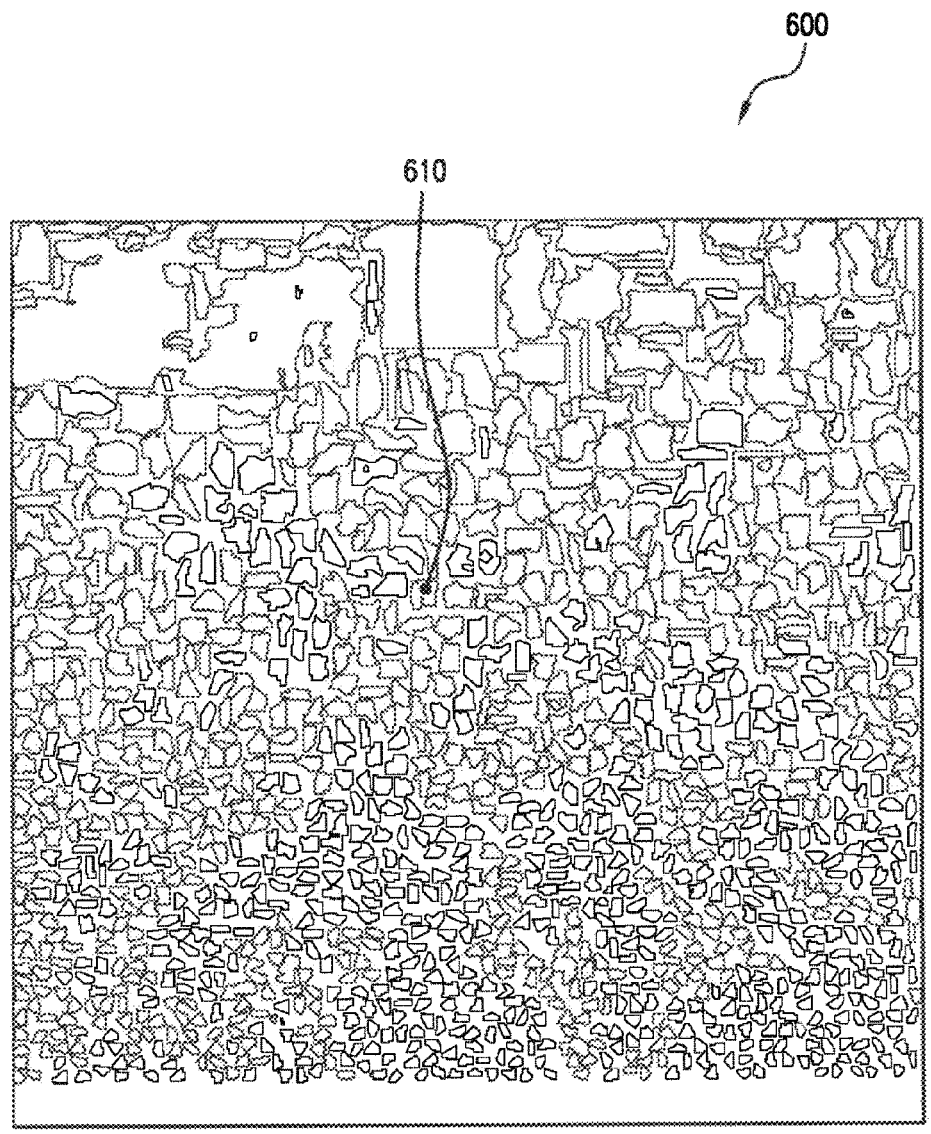
FIG. 6 is a diagram illustrating an initial texture atlas for a simplified three-dimensional model, according to an embodiment.

FIG. 6 is a diagram 600 illustrating an initial output texture atlas 600 for a simplified three-dimensional model, according to an embodiment. The pixels in initial output texture atlas 600 have not yet been assigned colors. In an example, texture engine 200 allocates an output texture atlas for the simplified three-dimensional model. The output texture atlas for the simplified model may be empty, and as explained in further detail below texture engine 220 may set a color value to each pixel in the texture atlas for the simplified three-dimensional model.

In an embodiment, model simplifying engine 210 simplifies a first three-dimensional model to determine a second three-dimensional model. In an embodiment, the first three-dimensional model is simplified by removing vertices in the first three-dimensional model and joining the edges connected to the removed vertices to other vertices in the first three-dimensional model.

Texture engine 220 allocates a texture atlas for the simplified three-dimensional model and fills in the texture atlas for the simplified three-dimensional model.

To fill in the texture atlas for the simplified three-dimensional model, texture engine 220 may determine a location on the second three-dimensional model corresponding to a pixel in the texture atlas for the second three-dimensional model, determine a location on the first three-dimensional model corresponding to the determined location on the second three-dimensional model, determine a color value texture mapped to the first three-dimensional model at the determined location on the first three-dimensional model, and set the determined color value to the pixel in the texture atlas for the second three-dimensional model. Texture engine 220 may perform these actions for each pixel in the texture atlas for the second three-dimensional model.

In an embodiment, for respective pixels in the texture atlas for the second three-dimensional model, texture engine 220 determines a location on the second three-dimensional model corresponding to the pixel. The location may be a three-dimensional point on the second three-dimensional model.

In an example, texture engine 220 determines that three-dimensional point 510 on simplified output mesh 500 corresponds to pixel 610 in texture atlas 600. Further, each point along the surface of simplified output mesh 500 may correspond to an area in texture atlas 600.

Texture engine 220 may then determine the location on the first three-dimensional model corresponding to the determined location on the second three-dimensional model. In an embodiment, to determine the location on the first three-dimensional model, texture engine 220 determines a ray extending from the location on the second three-dimensional model to a corresponding location on the first three-dimensional model and determines an intersection of the ray and the first three-dimensional model. In an embodiment, the location on the first three-dimensional model is not just the surface, but may be a three-dimensional point on the first three-dimensional model. It may be advantageous for texture engine 220 to refer back to the first three-dimensional model (e.g., higher resolution model) because the second three-dimensional model includes simplified meshes that lack lines in three-dimensional space. In this way, texture engine 220 may determine an appropriate color value for the pixel in the texture atlas for the second three-dimensional model.

In an example, texture engine 220 determines a ray extending from three-dimensional point 510 on simplified output mesh 500 to a corresponding location on meshes 310, 320, 330, or 340. For example, the ray may extend from three-dimensional point 510 to three-dimensional point 350 on mesh 320.

In an embodiment, the ray is normal to the second three-dimensional model. For example, to fill in some of the pixels in the texture atlas, a three-dimensional point on the second three-dimensional model corresponding to a particular pixel is computed. The three-dimensional point on the second three-dimensional model may be projected perpendicular to the mesh face to the nearest face in the first three-dimensional model.

In another embodiment, the ray is normal to the first three-dimensional model. In another embodiment, the ray extends to the first three-dimension model in a fixed direction (e.g., 0, 0, 1) or straight line.

After determining a ray extending from the location on the second three-dimensional model to a corresponding location on the first three-dimensional model, texture engine 220 determines an intersection of the ray and the first three-dimensional model. This may include determining a three-dimensional point on the first three-dimensional model that intersects with the ray.

After determining the location on the first three-dimensional model, texture engine 220 determines a color value texture mapped to the first three-dimensional model at the determined location on the first three-dimensional model. In an embodiment, texture engine 220 determines a color value texture mapped to the first three-dimensional model at the determined intersection.

Figure 7:
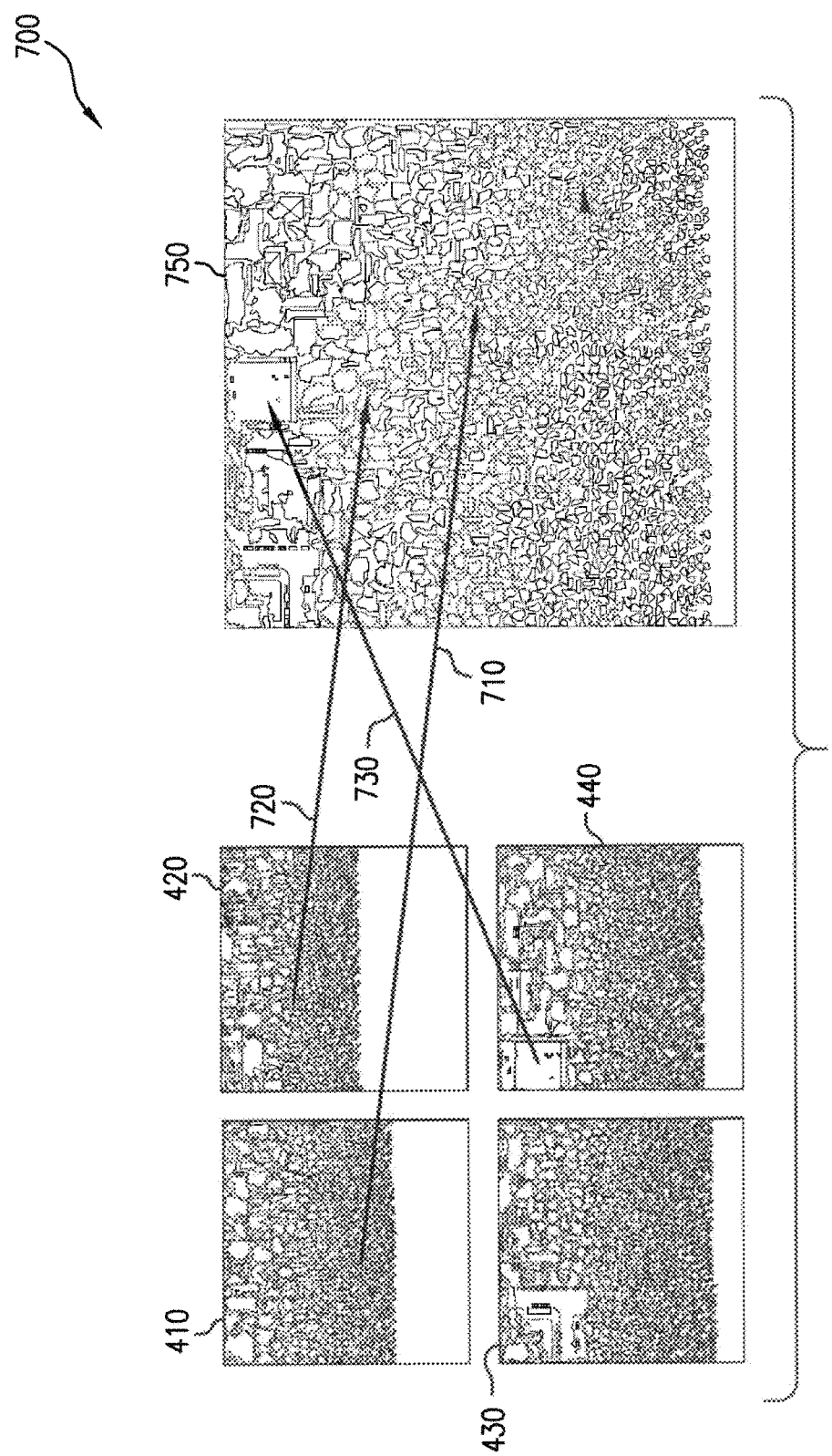
FIG. 7 is a diagram illustrating color values mapped to a three-dimensional model, according to an embodiment.

FIG. 7 is a diagram 700 illustrating color values mapped to a three-dimensional model, according to an embodiment. The color values are set to pixels in a texture atlas for a simplified version of the three-dimensional model. FIG. 7 includes texture atlases 410, 420, 430, and 440 for meshes 310, 320, 330, and 340, respectively (see FIGS. 3 and 4), and a texture atlas 750 for the second three-dimensional model. Texture atlas 750 includes space in an image in which color values are stored and mapped to a surface of the second three-dimensional model.

A color value texture in texture atlas 410 referenced by arrow 710 is mapped to a location on the first three-dimensional model. In an example, texture engine 220 determines the color value texture referenced by arrow 710. Texture engine 220 then sets the determined color value to the pixel in texture atlas 750 referenced by arrow 710. For example, the pixel color may be copied from the point's texture atlas position for the first three-dimensional model to the pixel in the texture atlas for the second three-dimensional model.

Similarly, texture engine 220 sets the color value referenced by arrow 720 in mesh 420 to the referenced pixel in texture atlas 750, and texture engine 220 sets the color value referenced by arrow 730 in mesh 440 to the referenced pixel in texture atlas 750.

Figure 8:
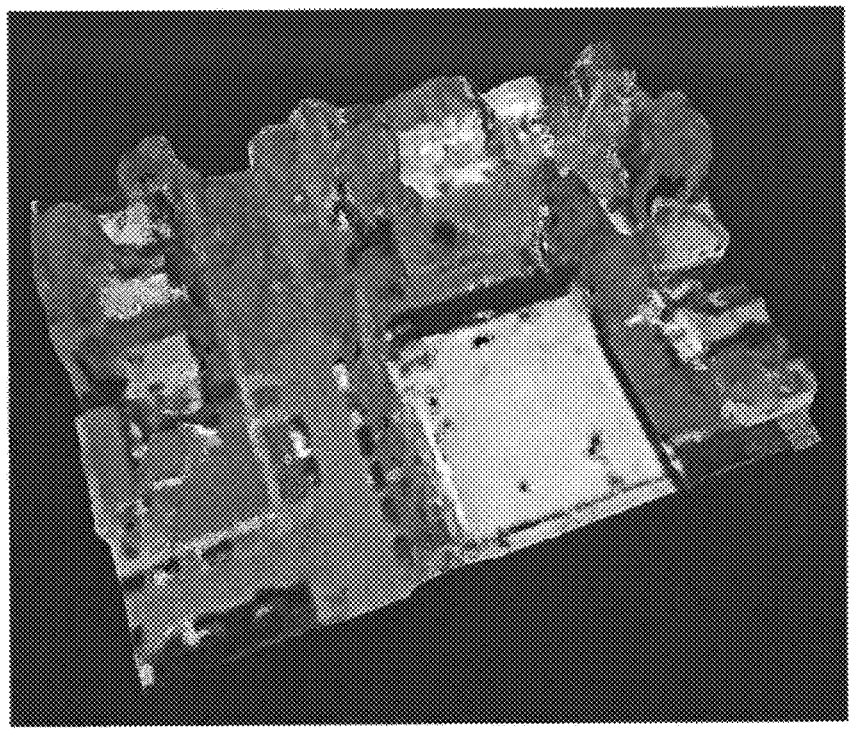
FIG. 8 is an illustration of a simplified textured three-dimensional model, according to an embodiment.

FIG. 8 is an illustration of a simplified textured three-dimensional model, according to an embodiment. For example, the simplified textured three-dimensional model may be the second three-dimensional model determined by model simplifying engine 210. The source texture atlas for the first three-dimensional model is different from the texture atlas for the second three-dimensional model.

Model simplifying engine 210 and texture engine 220 may be implemented as software, hardware, firmware, or any combination thereof.

VI. Example Method

Figure 9:
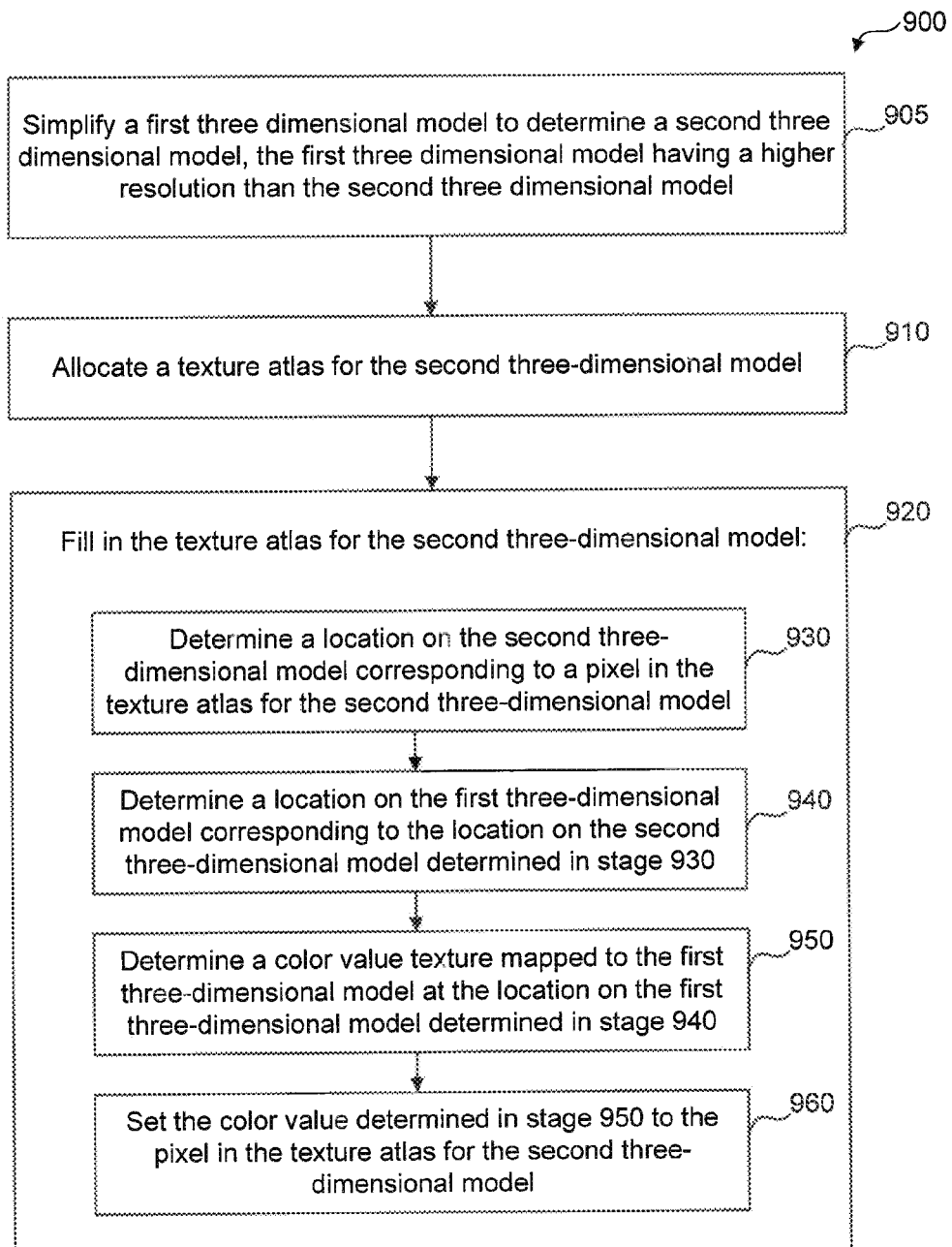
FIG. 9 is an illustration of a flowchart of an example method for simplifying a texture of a three-dimensional model, according to an embodiment.

FIG. 9 is an illustration of a flowchart 900 of an example method for simplifying a texture of a three-dimensional model, according to an embodiment. Method 900 may be used in operation of system 200 in FIG. 2. Although method 900 is described with respect to system 200, it is not meant to be limited to system 200.

At stage 905, a first three-dimensional model is simplified to determine a second three-dimensional model. The first three-dimensional model has a higher resolution than the second three-dimensional model. In an example, model simplifying engine 210 simplifies a first three-dimensional model to determine a second three-dimensional model, the first three-dimensional model having a higher resolution than the second three-dimensional model.

In an embodiment, the first three-dimensional model is simplified by removing vertices in the first three-dimensional model and joining the edges connected to the removed vertices to other vertices in the first three-dimensional model. The resulting simplified three-dimensional model may be the second three-dimensional model. Accordingly, the second three-dimensional model may include fewer vertices compared to the first three-dimensional model.

At stage 910, a texture atlas for the second three-dimensional model is allocated. In an example, texture engine 220 allocates a texture atlas for the second three-dimensional model. The first three-dimensional model also has a texture atlas. The texture atlas for the first three-dimensional model is different from the texture atlas for the second three-dimensional model.

At stage 920, the texture atlas for the second three-dimensional model is filled in. In an example, texture engine 220 fills in the texture atlas for the second three-dimensional model. Stage 920 may include stages 930-960.

At stage 930, a location on the second three-dimensional model corresponding to a pixel in the texture atlas for the second three-dimensional model may be determined. In an example, texture engine 220 determines a location on the second three-dimensional model corresponding to a pixel in the texture atlas for the second three-dimensional model. The location on the second three-dimensional model may be a three-dimensional point on the second three-dimensional model.

At stage 940, a location on the first three-dimensional model corresponding to the location on the second three-dimensional model determined in stage 930 is determined. In an example, texture engine 220 determines a location on the first three-dimensional model corresponding to the determined location on the second three-dimensional model. The location on the first three-dimensional model may be a three-dimensional point on the first three-dimensional model.

At stage 950, a color value texture mapped to the first three-dimensional model at the location on the first three-dimensional model determined in stage 940 is determined. In an example, texture engine 220 determines a color value texture mapped to the first three-dimensional model at the determined location on the first three-dimensional model.

In an embodiment, the location on the first three-dimensional is determined by determining a ray extending from the location on the second three-dimensional model to a corresponding location on the first three-dimensional model, and determining an intersection of the ray and the first three-dimensional model. The ray may be normal to the second three-dimensional model, normal to the first three-dimensional model, or may extend to the first three-dimension model in a fixed direction.

In an embodiment, texture engine 220 determines the color value texture mapped to the first three-dimensional model at the determined location on the first three-dimensional model by determining a color value texture mapped to the first three-dimensional model at the determined intersection.

At stage 960, the color value determined in stage 950 is set to the pixel in the texture atlas for the second three-dimensional model. In an example, texture engine 220 sets the determined color value to the pixel in the texture atlas for the second three-dimensional model.

Stages 905-960 may be implemented as software, hardware, firmware, or any combination thereof. Further, operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

V. Computer Embodiment

In an embodiment, the system and components of embodiments described herein are implemented using well known computers. For example, process flow diagram 100 and texture simplifying system 200 may be implemented using system 1000.

Figure 10:
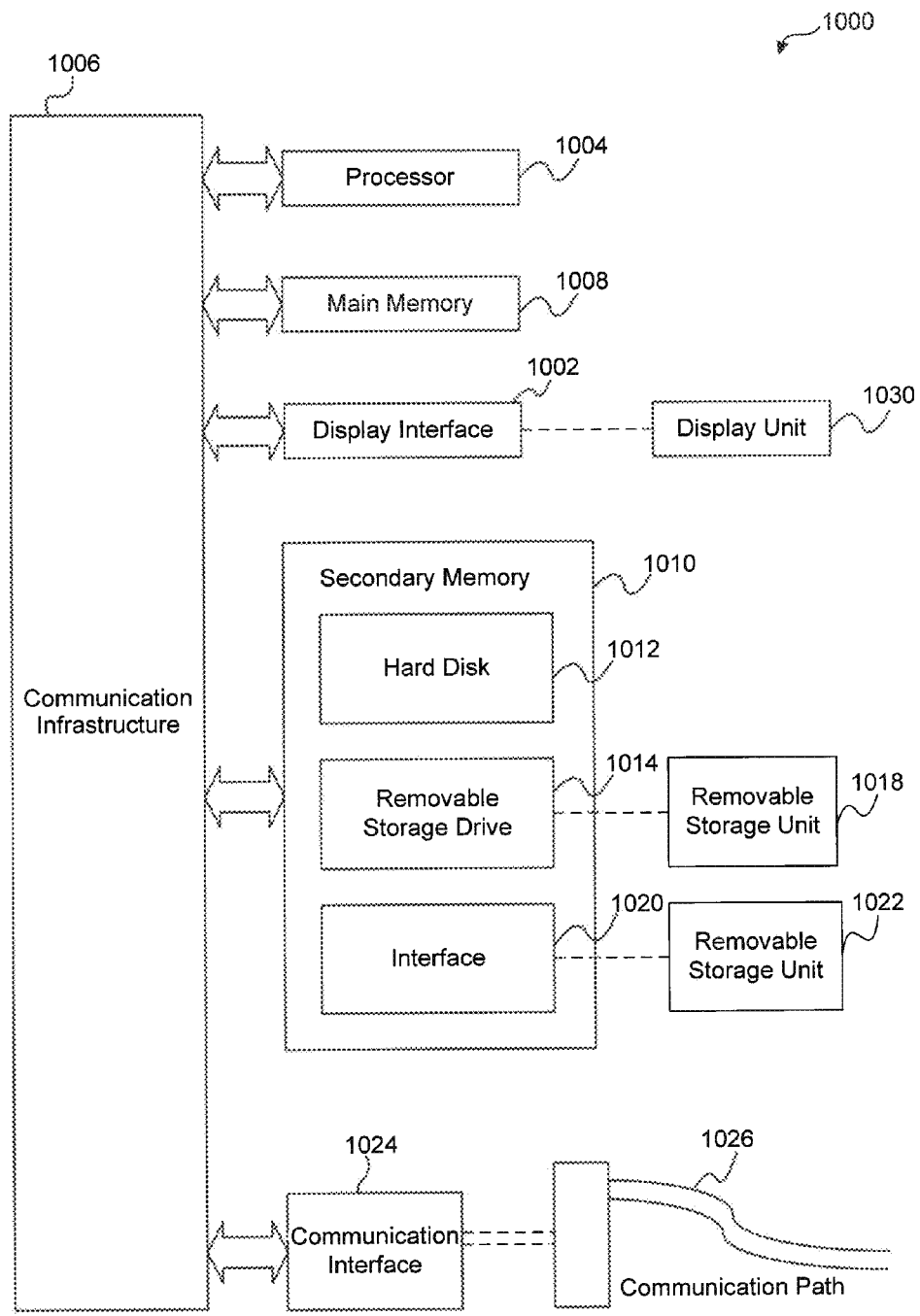
FIG. 10 is an illustration of an example computer system in which embodiments may be implemented as computer-readable code.

FIG. 10 is an illustration of an example computer system 1000 in which embodiments may be implemented as computer-readable code. Hardware, software, or any combination of such may embody any of the modules and components in FIGS. 1 and 2. Further, embodiments of model simplifying engine 210 and texture engine 220 can also be implemented as computer-readable code executed on one or more computing devices capable of carrying out the functionality described herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1000. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general-purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme. Computer system 1000 may also include display interface 1002 and display unit 1030. Display interface 1002 allows results of the computer operations to be displayed to a user or an application developer via display unit 1030.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement embodiments as discussed herein. In particular, the computer programs, when executed, enable processor device 1004 to implement the processes, such as the stages in the method illustrated by flowchart 900 of FIG. 9 discussed above. Accordingly, such computer programs represent controllers of the computer system 1000. Where embodiments are implemented using software, the software may be stored in a computer program product and loaded into computer system 1000 using removable storage drive 1014, interface 1020, and hard disk drive 1012, or communications interface 1024.

Embodiments also may be directed to computer program products including software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments as contemplated by the inventor(s), and thus, are not intended to limit the embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method for simplifying a texture of a three-dimensional model, comprising:
   (a) simplifying, with one or more computing devices, a first three-dimensional model to determine a second three-dimensional model, the first three-dimensional model having a higher resolution than the second three-dimensional model, the first three-dimensional model having a first texture atlas associated therewith that corresponds to a mapping of color onto at least a portion of a three-dimensional surface of the first three-dimensional model;
   (b) allocating, with the one or more computing devices, a second texture atlas for the second three-dimensional model; and
   (c) filling in, with the one or more computing devices, the second texture atlas for the second three-dimensional model such that the second texture atlas corresponds to a mapping of color onto at least a portion of a three-dimensional surface of the second three-dimensional model, wherein the filling in the second texture atlas (c) comprises:
   (d) determining, with the one or more computing devices, a location on the second three-dimensional model corresponding to a pixel in the second texture atlas for the second three-dimensional model;

(e) determining, with the one or more computing devices, a ray extending from the location on the second three-dimensional model determined in (d) to a corresponding location on the first three-dimensional model;

(f) determining, with the one or more computing devices, a color value texture ray and the first three-dimensional model;

(g) determining, with the one or more computing devices, a color value texture mapped to the first three-dimensional model at the intersection determined in (f) based on the first texture atlas; and (h) setting, with the one or more computing devices, the color value determined in (g) to the pixel in the second texture atlas for the second three-dimensional model.

2. The method of claim 1, wherein the location on the second three-dimensional model is a three-dimensional point on the second three-dimensional model.

3. The method of claim 1, wherein the corresponding location on the first three-dimensional model is a three-dimensional point on the first three-dimensional model.

4. The method of claim 1, wherein the ray is normal to the second three-dimensional model.

5. The method of claim 1, wherein the ray is normal to the first three-dimensional model.

6. The method of claim 1, wherein the ray extends to the first three-dimension model in a fixed direction.

7. The method of claim 1, wherein the first texture atlas for the first three-dimensional model is different from the second texture atlas for the second three-dimensional model.

8. The method of claim 1, wherein the simplifying (a) includes removing one or more vertices in the first three-dimensional model and joining edges connected to the one or more removed vertices to other vertices in the first three-dimensional model.

9. A system for simplifying a texture of a three-dimensional model, comprising:

a model simplifying engine configured to simplify a first three-dimensional model to determine a second three-dimensional model, the first three-dimensional model having a higher resolution than the second three-dimensional model, the first three-dimensional model having a first texture atlas associated therewith that corresponds to a mapping of color onto at least a portion of a three-dimensional surface of the first three-dimensional model; and a texture engine configured to:

(i) allocate a second texture atlas for the second three-dimensional model; and (ii) fill in the second texture atlas for the second three-dimensional model such that the second texture atlas corresponds to a mapping of color onto at least a potion of a three-dimensional surface of the second three-dimensional model, wherein when the texture engine fills in the second texture atlas for the second three-dimensional model, the texture engine is configured to:

determine a location on the second three-dimensional model corresponding to a pixel in the second texture atlas for the second three-dimensional model;

determine a ray extending from the determined location on the second three-dimensional model to a corresponding location on the first-three dimensional model;

determine an intersection of the ray and the first three-dimensional model determine a color value texture mapped to the first three dimensional model at the determined intersection based on the first texture atlas; and set the determined color value to the pixel in the second texture atlas for the second three-dimensional model.

10. The system of claim 9, wherein the location on the second three-dimensional model is a three-dimensional point on the second three-dimensional model.

11. The system of claim 9, wherein the ray is normal to the second three-dimensional model.

12. The system of claim 9, wherein the ray is normal to the first three-dimensional model.

13. The system of claim 9, wherein the ray extends to the first three-dimension model in a fixed direction.

14. The system of claim 9, wherein the first texture atlas for the first three-dimensional model is different from the second texture atlas for the second three-dimensional model.

15. An apparatus comprising at least one non-transitory computer readable storage medium encoding instructions thereon that, in response to execution by a computing device, cause the computing device to perform operations comprising:

(a) simplifying a first three-dimensional model to determine a second three-dimensional model, the first three-dimensional model having a higher resolution than the second three-dimensional model, the first three-dimensional model having a first texture atlas associated therewith that corresponds to a mapping of color onto at least a portion of a three-dimensional surface of the first three-dimensional model;

(b) allocating a second texture atlas for the second three-dimensional model; and (c) filling in the second texture atlas for the second three-dimensional model such that the second texture atlas corresponds to a mapping of color onto at least a portion of a three-dimensional surface of the second three-dimensional model, wherein the operations further comprise:

(d) determining a location on the second three-dimensional model corresponding to a pixel in the second texture atlas for the second three-dimensional model;

(e) determining a ray extending from location on the second three-dimensional model determined in (d) to a corresponding location on the first three-dimensional models, (f) determining, with the one or more computing devices, an intersection of the ray and the first three-dimensional model;

(g) determining a color value texture mapped to the first three-dimensional model at the intersection determined in (f) based on the first texture atlas; and (g) setting the color value determined in (g) to the pixel in the second texture atlas for the second three-dimensional model.

16. The apparatus of claim 15, wherein the location on the second three-dimensional model is a three-dimensional point on the second three-dimensional model.

17. The apparatus of claim 15, wherein the ray IS normal to the second three-dimensional model.

18. The apparatus of claim 15, wherein the ray is normal to the first three-dimensional model.

19. The apparatus of claim 15, wherein the ray extends to the first three-dimension model in a fixed direction.

20. The apparatus of claim 15, wherein the first texture atlas for the first three-dimensional model is different from the second texture atlas for the second three-dimensional model.

\* \* \* \* \*

UNITED STATES PATENT AND TRADEMARK OFFICE
CERTIFICATE OF CORRECTION

| | | |
|---|---|---|
| PATENT NO. | : 9,041,711 B1 | |
| APPLICATION NO. | : 13/466612 | |
| DATED | : May 26, 2015 | |
| INVENTOR(S) | : Hsu | |

It is certified that error appears in the above-identified patent and that said Letters Patent is hereby corrected as shown below:

In the Claims

Column 13, Line 7, please delete "a color value texture ray" and insert --an intersection of the ray--

Column 13, line 54, please delete "potion" and insert --portion--

Column 14, line 48, please delete "models," and insert --model,--

Signed and Sealed this
Sixteenth Day of August, 2016

Michelle K. Lee
*Director of the United States Patent and Trademark Office*